United States Patent
Kawashima et al.

(10) Patent No.: US 7,643,110 B2
(45) Date of Patent: *Jan. 5, 2010

(54) COLOR FILTER SUBSTRATE AND LIQUID CRYSTAL DISPLAY PANEL

(75) Inventors: Tomoya Kawashima, Tokyo-To (JP); Norihisa Moriya, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 273 days.

This patent is subject to a terminal disclaimer.

(21) Appl. No.: 11/373,065

(22) Filed: Mar. 10, 2006

(65) Prior Publication Data

US 2006/0209233 A1 Sep. 21, 2006

(30) Foreign Application Priority Data

Mar. 16, 2005 (JP) ............................. 2005-074342

(51) Int. Cl.
*G02F 1/1335* (2006.01)
*G02F 1/1333* (2006.01)
*G02F 1/1339* (2006.01)

(52) U.S. Cl. .................. 349/106; 349/60; 349/97; 349/104; 349/110; 349/117; 349/118; 349/119; 349/120; 349/121; 349/153; 349/190

(58) Field of Classification Search .......... 349/60, 349/97, 104, 106, 117–121, 153, 181, 190, 349/110

See application file for complete search history.

(56) References Cited

U.S. PATENT DOCUMENTS

| | | | | |
|---|---|---|---|---|
| 5,953,091 A | * | 9/1999 | Jones et al. ................. | 349/129 |
| 6,124,917 A | * | 9/2000 | Fujioka et al. ............. | 349/153 |
| 7,050,131 B2 | * | 5/2006 | Choi et al. .................. | 349/110 |
| 7,362,396 B2 | * | 4/2008 | Jeoung et al. ............... | 349/110 |
| 2001/0010574 A1 | * | 8/2001 | Hiroshi ........................ | 349/141 |
| 2003/0117573 A1 | * | 6/2003 | Yi et al. ....................... | 349/158 |
| 2003/0122998 A1 | * | 7/2003 | Iijima et al. ................. | 349/106 |
| 2004/0057000 A1 | * | 3/2004 | Hong .......................... | 349/117 |
| 2004/0165127 A1 | * | 8/2004 | Lin et al. ..................... | 349/110 |
| 2004/0227894 A1 | * | 11/2004 | Kim et al. .................... | 349/145 |
| 2005/0142464 A1 | * | 6/2005 | Moriya ......................... | 430/7 |
| 2005/0225700 A1 | * | 10/2005 | Takizawa .................... | 349/106 |
| 2006/0164580 A1 | * | 7/2006 | Ueda et al. .................. | 349/117 |

* cited by examiner

*Primary Examiner*—Brian M. Healy
*Assistant Examiner*—Hung Lam
(74) *Attorney, Agent, or Firm*—Burr & Brown

(57) ABSTRACT

There are provided a substrate which has solved an unsatisfactory adhesion problem of a seal part in a liquid crystal cell comprising a retardation layer provided on the inner side of the cell, and a liquid crystal cell using the substrate. A black matrix layer 12 formed of a resin composition containing a black colorant and its picture frame part 12A, a color filter layer 13, and a retardation layer 14 are stacked on a substrate 11, and an area including at least the picture frame part 12A is an area to be sealed.

7 Claims, 4 Drawing Sheets

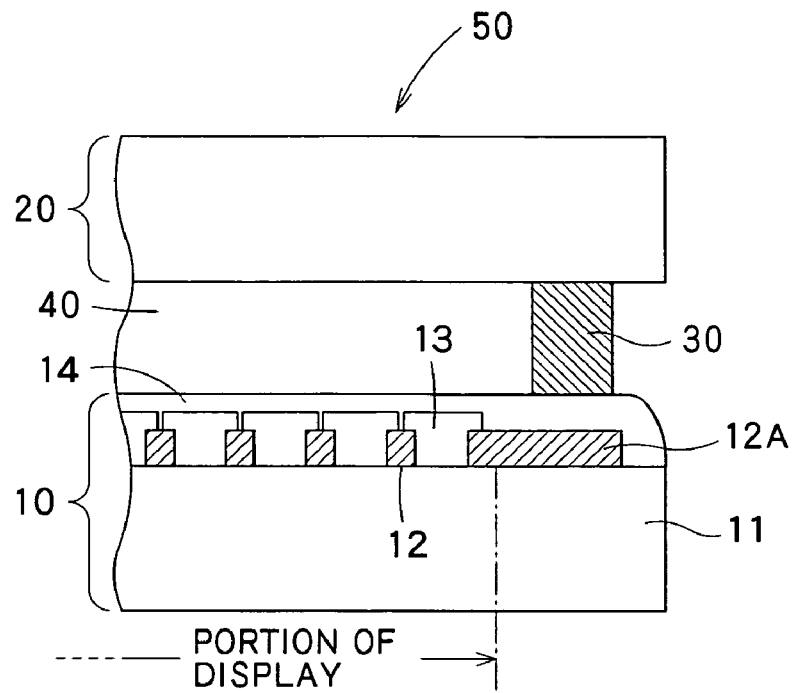
F I G. 1
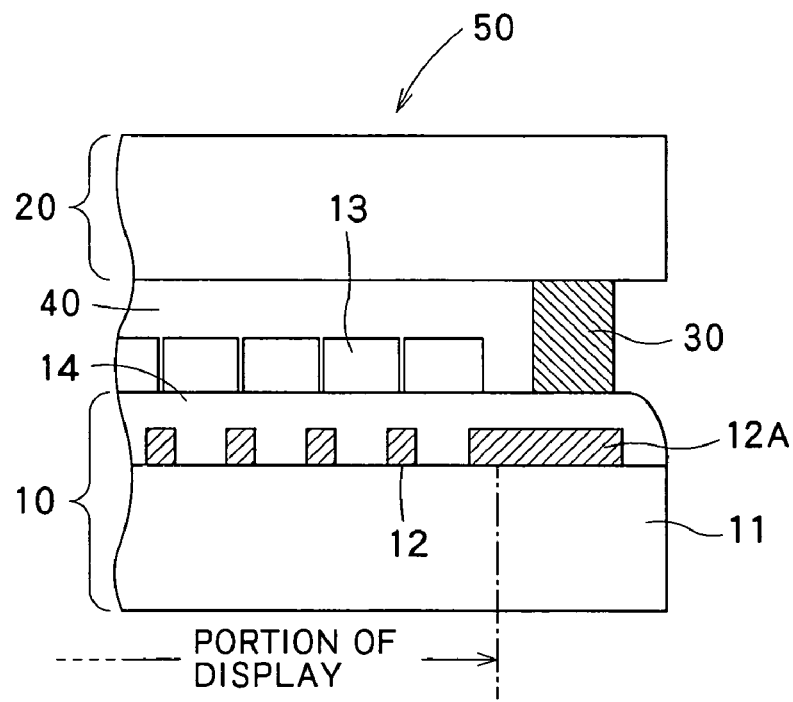
F I G. 2

COLOR FILTER SUBSTRATE AND LIQUID CRYSTAL DISPLAY PANEL

BACKGROUND OF THE INVENTION

1. Field of the Invention

The present invention relates to a color filter substrate, and a liquid crystal display panel comprising the color filter substrate stacked on a counter substrate through a seal material.

2. Background Art

A retardation film for controlling a phase difference has hitherto been used in liquid crystal displays. For example, in the reflection-type liquid crystal display, in general, a linearly polarizing plate and a ¼λ retardation plate are used in combination to provide circularly polarized light. Further, in recent years, in a liquid crystal display of a homeotropic alignment mode widely used in liquid crystal TV applications, in order to reduce the dependency of display upon the angle of visibility, a retardation film having an optical axis perpendicular to the substrate and having a negative birefringence anisotropy (a negative C plate) and a retardation film having an optical axis horizontal to the substrate and having a positive birefringence anisotropy (a positive A plate) are used in combination. Many other retardation films are commercially available including view angle compensation films using discotic liquid crystals.

All the above conventional retardation films are applied to the outer side of the liquid crystal cell. In this case, for the reason that different retardation films, or a retardation film and a polarizing plate are applied to each other at a certain specific angle and for the reason that the refractive index of a pressure-sensitive adhesive for application is different from the refractive index of the retardation plate and the refractive index of the polarizing plate, external light reflection occurs at the lamination interface, leading to lowered display contrast.

In recent years, an attempt has been made to provide a retardation layer utilizing a liquid crystal material within a liquid crystal cell (Japanese Patent Laid-Open No. 48627/1998). Such liquid crystal materials usable herein include, for example, liquid crystalline polymers having a glass transition point and capable of freezing the liquid crystal structure at or below the glass transition temperature, and liquid crystalline monomers which can cause three-dimensional crosslinking in a liquid crystal layer state utilizing a reactive group such as an unsaturated bond in a molecular structure and consequently can freeze the liquid crystal structure. The liquid crystal materials can be applied by coating onto a base material having an aligning function. The retardation layer provided within the liquid crystal cell can eliminate the drawbacks of conventional retardation films of a type applied to the outside of the liquid crystal cell.

When a retardation layer is provided on the inner side of the liquid crystal cell, the retardation layer is provided on any one of a pair of substrates constituting the liquid crystal cell. Typically, the retardation layer is provided on the inner side of a color filter substrate with a color filter. The liquid crystal cell is constructed so that a color filter substrate and a counter substrate are provided in combination and a liquid crystal material is filled into between the substrates. Both the substrates face each other while providing a given space therebetween, and the peripheral part of the substrates are sealed with a seal material.

When a retardation film is provided on the outer side of the liquid crystal cell as in the prior art, both the substrates on their inner sides (liquid crystal material filling sides) are intimately contacted with each other through a seal material. When a retardation layer is provided on the inner side of the liquid crystal cell, however, for the retardation layer, the black matrix, and the seal material, mutual positional relationship and mutual adhesion should be taken into consideration.

Originally, the provision of the black matrix, the color filter layer, and the retardation layer only in a part corresponding to the display part in the substrate suffices for contemplated results. Regarding the retardation layer, however, this layer is formed by coating and thus is preferably provided on the whole area or substantially the whole area of the substrate. On the other hand, the color filter layers are formed by patterning using a photosensitive resin composition upon ultraviolet irradiation and development so that the color layers are arranged in a predetermined array for each color in a large number of fine areas (patterning areas) surrounded by a black matrix. Therefore, in general, the color filter layers are formed only in the display part of the substrate. Further, for the black matrix, a picture frame part having a relatively large width is formed around the display part from the viewpoint of ensuring light shielding properties, that is, preventing light leakage toward the outside of the display part (lateral leakage).

The peripheral part of the display part is also a site which serves as a seal part to which the seal material is applied in the formation of the liquid crystal cell. Accordingly, when the width of the picture frame part of the black matrix is a certain value, in some cases, the seal part is formed so as to astride a picture frame part-provided part and a picture frame part-free part. When the seal part is provided in a level difference part, in coating the composition for seal material formation followed by heating, a difference in thermal shrinkage in a thickness-wise direction of the composition for seal material formation occurs between the case where the picture frame part of the black matrix is present as the layer underlying the seal material and the case where the picture frame part of the black matrix is absent as the layer underlying the seal material, and, consequently, distortion sometimes occurs within the seal material.

SUMMARY OF THE INVENTION

The present inventors have found that, when a picture frame part of a black matrix is provided on a substrate in its periphery corresponding to the periphery of the display part, a color filter substrate can be prepared without causing distortion of a seal material by providing a seal material so as to correspond to the picture frame part-provided position. The present invention has been made based on such finding.

Accordingly, an object of the present invention is to provide a color filter substrate, in which, in a liquid crystal cell having a retardation layer provided on the inner side of the cell, distortion of the seal material caused by a heat shrinkage difference at the time of seal material formation has been suppressed.

According to the present invention, there is provided a color filter substrate comprising: a substrate; and at least a black matrix layer, a color filter layer, and a retardation layer stacked on the substrate, wherein the black matrix layer is formed of a resin composition containing a black colorant and comprises a display part having an opening part for displaying an image and an opening part-free picture frame part provided on the periphery of the display part, the color filter layer is stacked only in the display part in the black matrix layer in its part excluding the picture frame part, and the black matrix layer in its area excluding the display part and including at least the picture frame part is an area to be sealed.

In a preferred embodiment of the present invention, the black matrix layer, the color filter layer, and the retardation layer are stacked in that order on the substrate.

In another preferred embodiment of the present invention, the black matrix layer, the retardation layer, and the color filter layer are stacked in that order on the substrate.

In a further preferred embodiment of the present invention, the area to be sealed includes an area where the picture frame part is stacked.

In another preferred embodiment of the present invention, the area to be sealed is an area where the picture frame part is stacked.

In still another preferred embodiment of the present invention, the area to be sealed is an area where the retardation layer is not stacked.

In a further preferred embodiment of the present invention, the area to be sealed is an area including the retardation layer-stacked area.

In another preferred embodiment of the present invention, the area to be sealed is an area where the retardation layer is stacked.

According to the present invention, there is also provided a liquid crystal display panel comprising: a color filter substrate and a counter substrate stacked on top of each other through a seal material; and a liquid crystal hermetically filled into between both the substrates, wherein the color filter substrate is a color filter substrate according to any one of claims 1 to 8, and the seal material is provided on an area to be sealed in the color filter substrate.

According to the present invention, in a color filter substrate comprising a black matrix layer formed of a black colorant-containing resin composition, the picture frame part is also provided on the periphery of the display part, and an area including at least this picture frame part is an area to be sealed. Therefore, as compared with the case where any picture frame part is not provided, the distortion of the seal material can be suppressed.

BRIEF DESCRIPTION OF THE DRAWINGS

FIG. 1 is a diagram showing an example of a liquid crystal display panel and a color filter substrate;

FIG. 2 is a diagram showing another example of a liquid crystal display panel and a color filter substrate;

DETAILED DESCRIPTION OF THE INVENTION

Figure 3:
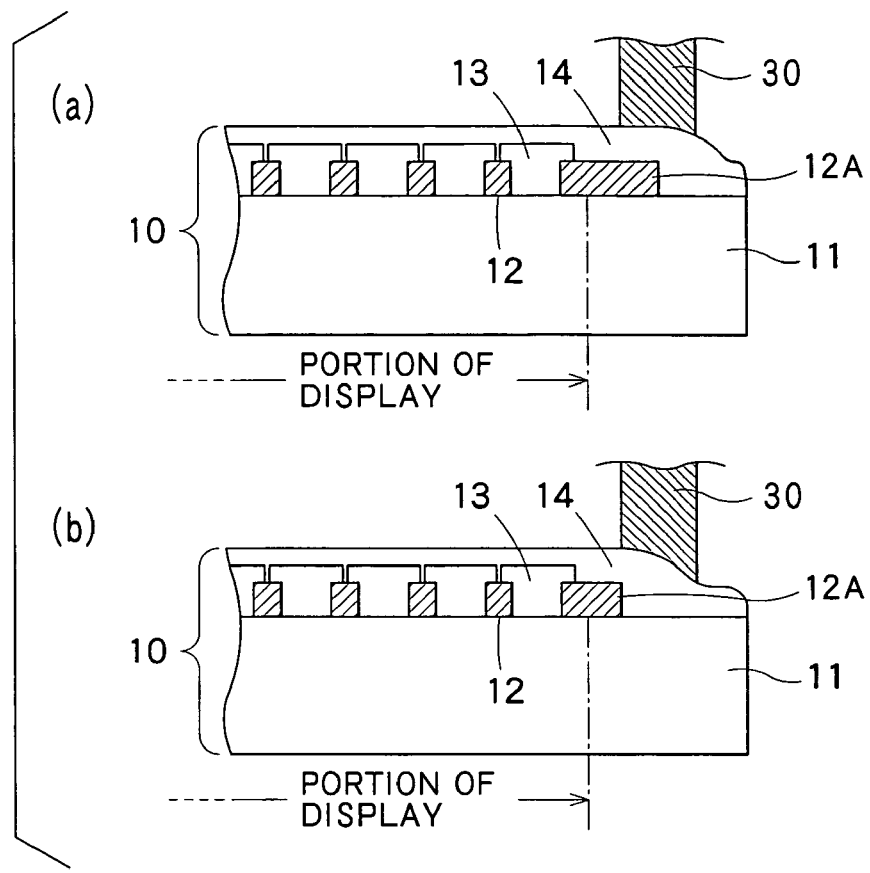
FIG. 3 is a diagram showing the relationship between the width of a picture frame part in a black matrix and a seal position.

FIG. 1 is a typical diagram showing a sectional structure of a color filter substrate and a liquid crystal display panel in a preferred embodiment of the present invention.

As shown in FIG. 1, a liquid crystal display panel 50 includes a color filter substrate 10 and a counter substrate 20 stacked on top of each other through a seal material 30 provided on the peripheral part of both the substrates, and a liquid crystal 40 is hermetically filled and sealed in the inner side of both the substrates. The color filter substrate 10 comprises a black matrix layer 12, a color filter layer 13, and a retardation layer 14 stacked in that order on a substrate 11.

The black matrix layer 12 is formed of a resin composition containing a black colorant and has, for example, a black color having low light reflectance. In the position corresponding to the image display part in the liquid crystal display panel 50, the black matrix layer 12 comprises a part which has been patterned so that openings are arranged (hereinafter referred to as "display part"), and an opening-free peripheral part (hereinafter referred to as "picture frame part") which is provided around the display part and is formed of the same material as the display part. In the construction of the liquid crystal display panel 50, in general, for example, a transparent electrode layer and an aligning film are further stacked on the color filter substrate 10 side, and, for example, TFT and an aligning film are stacked on the substrate on the counter substrate side. For both the substrates, for example, a terminal for externally supplying electric power should be provided.

FIG. 2 is a typical sectional structure of a color filter substrate and a liquid crystal display panel in another embodiment of the present invention.

The sectional structure shown in FIG. 2 is different from the sectional structure shown in FIG. 1 in the stacking position of the color filter layer 13. Specifically, in the construction shown in FIG. 2, a retardation layer 14 is first stacked on a black matrix layer 12, and a color filter layer 13 is stacked on the retardation layer 14. The other members are the same as those described above in connection with FIG. 1. Even when the order of stacking of the color filter layer 13 and the retardation layer 14 is changed, there is no difference in function of both the layers as the liquid crystal display panel and, thus, these layers may be stacked in any order.

In FIGS. 1 and 2, a picture frame part 12A in a black matrix is covered with a retardation layer 14, and a seal material 30 is provided only in a position corresponding to the position where the picture frame part 12A is provided. Therefore, a seal material is provided in a part where the retardation layer 14 is flat (that is, a part where there is no level difference between the presence of the picture frame part and the absence of the picture frame part).

The seal material 30, the picture frame part 12A, and the retardation layer 14 are most preferably disposed as shown in FIGS. 1 and 2. When the upper surface of the retardation layer 14 in its position where the seal material 30 is provided is flat, the picture frame part 12A and the retardation layer 14 are not always required to be provided to the end of the substrate 11.

As shown in FIGS. 1 and 2, the seal material 30 is preferably provided so as not to be extended beyond the picture frame part 12A-provided part. However, if the flatness of the retardation layer 14 is ensured to some extent, the seal material 30 could be somewhat extended beyond the picture frame part 12A. The flatness of the retardation layer 14 will be described with reference to FIG. 3.

As with FIGS. 1 and 2, FIG. 3 shows a color filter substrate 10 for constituting a liquid crystal display panel. The upper part of a seal material 30 and a counter substrate 20 are the same as those shown in FIGS. 1 and 2 and thus are omitted in FIG. 3.

In the embodiment shown in FIG. 3(a), the width of the picture frame part 12A in the black matrix 12 is smaller than that in the embodiments shown in FIGS. 1 and 2. The left-half part of the seal material 30 is provided at a position where the picture frame part 12A is present, and the right-half part of the seal material 30 is provided at a position where the picture frame part 12A is not present. That is, the seal material 30 is provided so as to astride the picture frame part 12A-provided part and the picture frame part 12A-free part. The periphery of the picture frame part 12A has a level difference correspond to the thickness of the picture frame part. Since, however, the retardation layer 14 is provided on the level difference, the level difference on the surface of the retardation layer 14 is somewhat relaxed. That is, the level difference of the retardation layer 14 is not steeply changed at the position corresponding to the periphery of the picture frame part 12A, and the flatness of the retardation layer is more significantly lost toward the end (around the end of the substrate 11) of the retardation layer 14 (the section of the retardation layer is rounded). Accordingly, the left-half part of the seal material 30 is provided at a position where the surface of the retardation layer 14 is flat, and the right-half part is provided at a position wherein the flatness of the retardation layer 14 is lost.

In the embodiment shown in FIG. 3(b), the seal material 30 is provided at a position where the picture frame part 12A is absent. The seal material 30 is provided on the retardation layer 14 so that the outer side (right end of 12A in the drawing) of the periphery of the picture frame part 12A conforms to the inner side (left end of 30 in the drawing) of the periphery of the seal material 30. Regarding the surface of the retardation layer 14, the flatness is not significantly lost at a position around the position where the picture frame part 12A is present. However, the flatness of the surface of the retardation layer 14 is rapidly lost when the distance of the retardation layer 14 from the end of the substrate is smaller. The section of the retardation layer is rounded on the outer side of the periphery of the picture frame part 12A. The seal material 30 is disposed on the retardation layer 14 in its position where the flatness is lost.

Accordingly, in order to provide the seal material 30 in a flat part, it is most preferred that the position where the seal material is provided, fully conforms to the position of the picture frame part 12A in the black matrix (100% overlap of mutual disposition position). In the present invention, however, the percentage overlap of deposition of both the seal material and the picture frame part 12A is not always required to be 100%, and the percentage overlap is preferably not less than 20%, more preferably not less than 50%.

In the liquid crystal display panel 50, two or more colors, generally three colors or four colors, are displayed. To this end, fine areas for respective predetermined colors are provided in the color filter layer 13. For example, fine areas for respective colors of red (R), green (G), and blue (B) are regularly arranged vertically and horizontally, for example, in the order of R, G, B, R, G, B . . . to form an assembly. The black matrix layer 12 functions to partition fine areas for respective colors constituting the color filter layer 13 and, at the same time, functions to prevent leakage of external light from a gap part caused at the boundary of each area, unnecessary reflection and the like. The black matrix layer 12 is formed, for example, in a unidirectional or bidirectional lattice, network, or honeycomb form and is generally black. Although the outer shape of the black matrix layer is not always identical and varies depending upon applications, one example of the outer shape is a lattice form which has a horizontal to vertical ratio of, e.g., 3:4 or 9:16.

The black matrix layer 12 and the color filter layer 13 are stacked on a substrate which is somewhat larger than the size (display size) of a part (display part) which generally actually participates in the display. In this case, the black matrix layer 12 and the color filter layer 13 are stacked so that a margin is provided on the periphery of the substrate. The black matrix layer 12 is formed of a black colorant-containing resin composition, and a picture frame part 12A, which is not patterned (that is, is free from opening), is provided around the display part. The picture frame part 12A may be extended to the end of the substrate 11, or alternatively may be provided so that a margin not covered with the picture frame part 12A is provided at the end of the substrate.

As with the black matrix layer 12 and the color filter layer 13, the provision of a retardation layer 14 only in the display part suffices for satisfactory function. Since, however, the retardation layer 14 and the seal material 30 have good adhesion to each other, the retardation layer 14 is preferably provided so as to cover an area to be sealed. In order to stack the retardation layer 14 only in a specific area for stacking while providing a margin around the substrate, any patterning means is necessary. In general, after the formation of the retardation layer on the whole area of the substrate 11, the unnecessary part is removed by pattern-wise exposure and development. From the viewpoint of forming the retardation layer 14, preferably, the retardation layer is stacked on the whole area of the substrate 11. In FIGS. 1 and 2, the retardation layer 14 is extended to a position outside the peripheral part of the color filter layer 13 and is provided somewhat wider than the picture frame part 12A-provided part in the black matrix layer. The seal material 30 is stacked in an area where the picture frame part 12A in the black matrix layer is present, the color filter layer 13 is absent, and the picture frame part 12A is covered by the retardation layer 14. However, the following other embodiments may also be adopted.

FIGS. 4 to 7 each are a diagram showing a positional relationship of the layers constituting the color filter substrate 10 and the color filter substrate 10 in a liquid crystal display panel. In particular, FIGS. 4 to 7 show various embodiments in which the positional relationship of the picture frame part 12A in the black matrix layer, the retardation layer 14 and the seal material 30 relative to the substrate 11 is different. All of FIGS. 4 to 7 are enlarged typical views of an upper right corner part in the liquid crystal display panel when the liquid crystal display panel is observed from the counter substrate side. For convenience, such a state that the counter substrate 20 has been removed from the liquid crystal display panel 50 shown in FIGS. 1 and 2 is shown.

Figure 4:
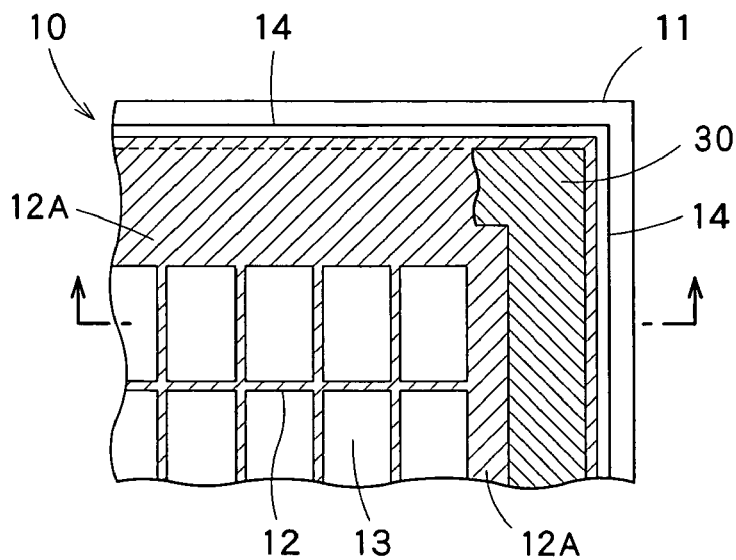
FIG. 4 is a diagram showing such a state that a seal material is stacked on a picture frame part and a retardation layer.

In the embodiment shown in FIG. 4, a color filter layer 13 comprising assembled voids representing individual fine areas, and a black matrix layer 12 (shown as a thick hatched part) for partitioning individual fine areas in the color filter layer 13 are stacked on the substrate 11. Further, the black matrix layer 12 has a picture frame part 12A which is a part extended to a part around the black matrix layer 12 and is free from any opening. The picture frame part 12A is stacked on the substrate 11 so as to provide a margin around the substrate 11. In this embodiment, the color filter layer is provided only on the display part. The retardation layer 14 is stacked so as to cover the black matrix layer 12 and the color filter layer 13 and to be somewhat wider than the picture frame part 12A in the black matrix layer and to provide a narrow width margin around the substrate 11. The picture frame part 12A or/and the retardation layer 14 may be extended to the end of the substrate (that is, so as not to provide any margin). In particular, when the retardation layer 14 is extended to the end around the substrate, unlike the black matrix layer 12, there is no need to conduct patterning. Therefore, this embodiment is suitable for the formation of a retardation layer by a method which cannot regulate the application range, for example, by spin coating.

In the embodiment shown in FIG. 4, the seal material 30 is stacked on an area where the black matrix layer in its picture frame part 12A and the retardation layer 14 are provided. In FIG. 3, the section in a line provided with an arrow in its both ends corresponds to the section of the part of the color filter substrate 10 and the seal material 30 in the liquid crystal display panel 50 shown in FIG. 1. Accordingly, in the embodiment shown in FIG. 4, the layer construction of the assembly in its part where the seal material 30 is provided should be such that the substrate 11, the picture frame part 12A, the retardation layer 14, and the seal material 30 are stacked in that order.

Figure 5:
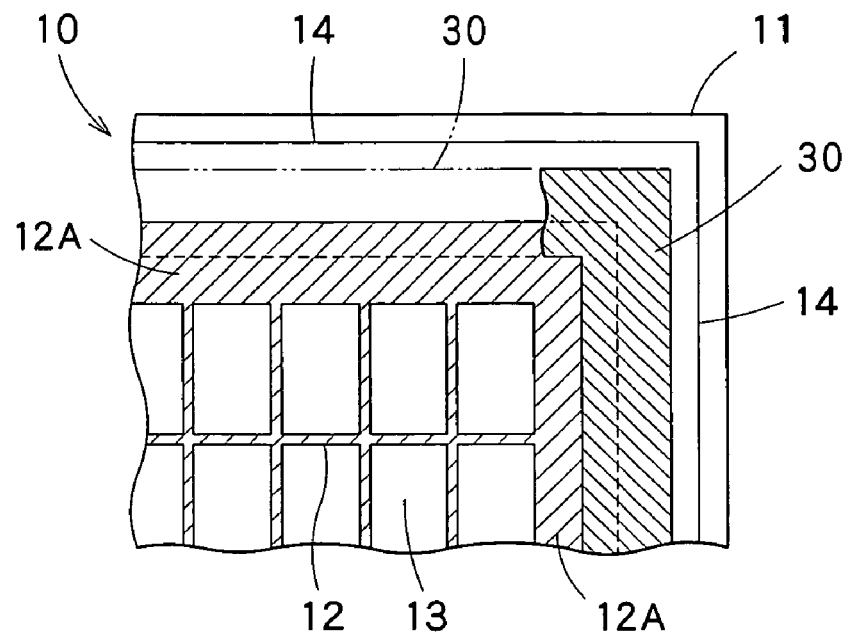
FIG. 5 is a diagram showing such a state that a seal material is stacked on a picture frame part, a picture frame part-free part, and a retardation layer.
Figure 6:
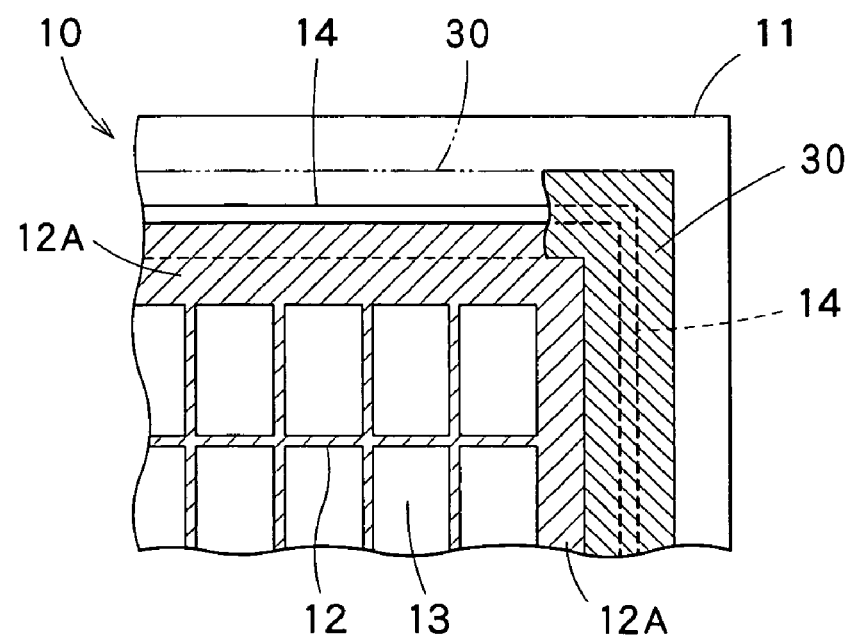
FIG. 6 is a diagram showing such a state that a seal material is stacked on a part where a picture frame part and a retardation layer are present, and a part where a picture frame part and a retardation layer are absent.
Figure 7:
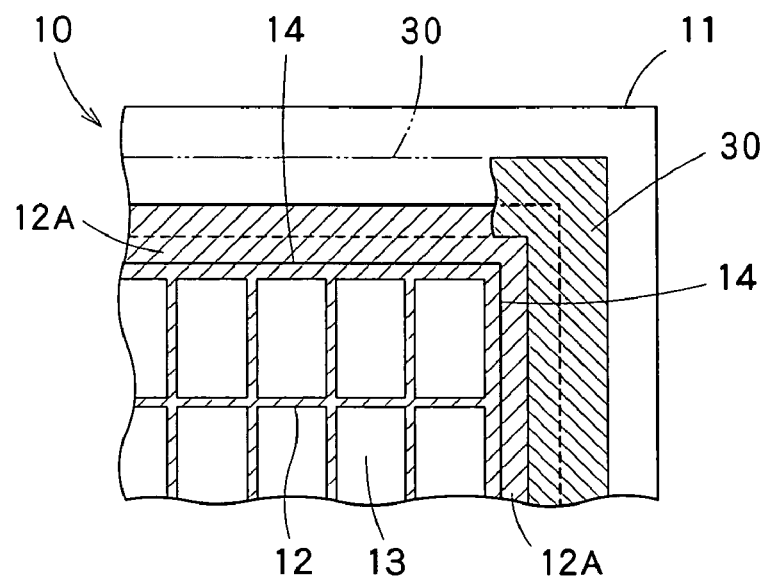
FIG. 7 is a diagram showing such a state that a seal material is stacked on a picture frame part and on a part which is free from the picture frame part and is free from a retardation layer.

In the embodiments shown in FIGS. 5 to 7, as compared with the liquid crystal display panel in the embodiment shown in FIG. 4, the area occupied by the picture frame part 12A or/and the retardation layer 14 is smaller.

In the embodiment shown in FIG. 5, the retardation layer 14 is formed on the same position as the position in the embodiment shown in FIG. 4. In FIG. 5, however, the black matrix layer is stacked so that the peripheral part of the picture frame part 12A in the black matrix layer is formed in a more inward part. The peripheral part of the picture frame part 12A in the black matrix layer is located substantially at the center of the width of the seal material. As a result, the seal material 30 is located at a position which lies across the picture frame part 12A-provided area and the picture frame part 12A-free part in the black matrix layer.

In the embodiment shown in FIG. 6, the picture frame part 12A is formed at the same position as in the embodiment shown in FIG. 5. In the embodiment shown in FIG. 6, however, the retardation layer 14 is formed so as to be somewhat wider than the picture frame part 12A. In FIG. 6, the peripheral part of the retardation layer 14 is somewhat outside the peripheral part of the picture frame part 12A. Alternatively, the peripheral part of the retardation layer 14 may overlap with the peripheral part of the picture frame part 12A. Further, the peripheral part of the retardation layer 14 may be located a slightly inward position from the peripheral part of the picture frame part 12A. In the embodiment shown in FIG. 6, the effect of relaxing the level difference between the picture frame part 12A-provided part and the picture frame part 12A-free part by the retardation layer 14 is reduced. However, the flatness of the picture frame part 12A-provided part and the picture frame part 12A-free part can be ensured.

In the embodiment shown in FIG. 7, the picture frame part 12A is formed at the same position as in the embodiment shown in FIG. 6. In the embodiment shown in FIG. 7, however, the retardation layer 14 is formed in such a size that it covers the black matrix layer 12 and does not substantially cover the picture frame part 12A. In this case, as compared with the embodiment shown in FIG. 6, the area is further reduced.

In the embodiment shown in FIG. 7, since the retardation layer 14 is not present at all as a layer underlying the seal material 30, the retardation layer does not have the effect of relaxing the level difference between the picture frame part 12A-provided part and the picture frame part 12A-free part. However, the flatness of the picture frame part 12A-provided part and the picture frame part 12A-free part can be ensured.

Each member constituting the color filter substrate according to the present invention will be described.

(1) Substrate

The substrate 11 is preferably formed of an inorganic base material such as glass, silicon, or quartz. The substrate 11 may also be formed of the following organic base material. Examples of organic base materials include acrylic materials such as polymethyl methacrylate, polyamide, polyacetal, polybutylene terephthalate, polyethylene terephthalate, polyethylene naphthalate, triacetylcellulose, or syndiotactic polystyrene or the like, polyphenylene sulfide, polyether ketone, polyether ether ketone, fluororesin or polyethernitrile or the like, polycarbonate, modified polyphenylene ether, polycyclohexene or polynorbornene resin or the like, or polysufone, polyether sulfone, polysulfone, polyallylate, polyamideimide, polyether-imide, or thermoplastic polyimide. Further, conventional plastics may also be used as the organic base material. The thickness of the substrate is not particularly limited. For example, a thickness in the range of about 5 μm to several millimeters may be adopted dependent upon applications.

(2) Black Matrix Layer

The black matrix layer may be formed by applying a black colorant-containing coating material-type resin composition onto one side, once solidifying the coating, applying a photoresist, and forming a predetermined pattern, or by coating a black colorant-containing coating material-type photosensitive resin composition and subjecting the coating to patternwise exposure and development. The thickness of the black matrix is about 0.5 to 2 μm.

(3) Color Filter Layer

The fine areas for respective colors constituting the color filter layer 13 may be formed in each opening of the black matrix layer 12. However, for convenience, the fine areas may be formed in a strip form. The color filter layer is formed from a resin composition containing a colorant dissolved or dispersed therein, preferably containing a fine pigment dispersed therein. The color filter layer may be formed by preparing an ink composition which has been colored in a predetermined color, and conducting printing for each color pattern. More preferably, however, the color filter layer is formed by photolithography using a coating material-type photosensitive resin composition containing a colorant of a predetermined color. The thickness of the color filter layer is about 1 μm to 5 μm.

(4) Retardation Layer

The retardation layer 14 is formed of a liquid crystal material which has been solidified while retaining the aligned state. The retardation layer 14 may have a single layer structure or two or more layer structure according to need. The liquid crystal material for constituting the retardation layer may be a liquid crystal material having positive birefringence anisotropy or a liquid crystal material having negative birefringence anisotropy. A nematic liquid crystal having a rod-like structure may be mentioned as a liquid crystal material having positive birefringence anisotropy, and a discotic liquid crystal having a disc structure may be mentioned as a liquid crystal material having negative birefringence anisotropy. These liquid crystal materials include liquid crystal monomers, liquid crystal oligomers, or liquid crystal polymers. From the viewpoint of curing while retaining the aligned state, preferred are polymerizable liquid crystals, especially polymerizable liquid crystal monomers, which are polymerized and cured upon exposure to ionizing radiations such as ultraviolet light and electron beams.

Since the retardation level and the alignment properties are determined by the birefringence Δn of liquid crystal molecules and the thickness of the retardation layer, Δn is preferably about 0.03 to 0.15. The chiral agent mixed into the nematic liquid crystal is not particularly limited so far as a desired spiral pitch is induced without sacrificing the liquid crystallinity of the liquid crystal material. Such chiral agents are low molecular compounds having a molecular weight of not more than 1500 and include compounds which have chirality in the molecule thereof and contains one or at least two asymmetric carbon atoms, compounds having an asymmetic point on a heteroatom such as chiral amine or chiral sulfoxi-5-de, or compounds having an axial asymmetrical and optically active site such as cumulene and binaphthol.

Regarding the liquid crystal material and optionally used chiral agent, curing while retaining the aligned state can be realized by preparing an ionizing radiation polymerizable liquid crystal composition containing a chiral agent, a polymerization initiator or the like, for example, in the case of a polymerizable liquid crystal monomer, for example, a photopolymerizable liquid crystal composition, coating the composition onto an object face, subjecting the coating to alignment treatment, and further exposing the treated coating an ionizing radiation (for example, exposure to ultraviolet light).

The polymerizable liquid crystal monomer may be one, for example, disclosed in Published Japanese Translation of PCT Publication No. 508882/1998, and the polymerizable chiral agent may be one, for example, disclosed in Japanese Patent Laid-Open No. 258638-1995.

Specifically, compounds represented by formulae (1) to (11) may be used as the polymerizable liquid crystal monomer, and compounds represented by formulae (12) to (14) are suitable as the polymerizable chiral agent.

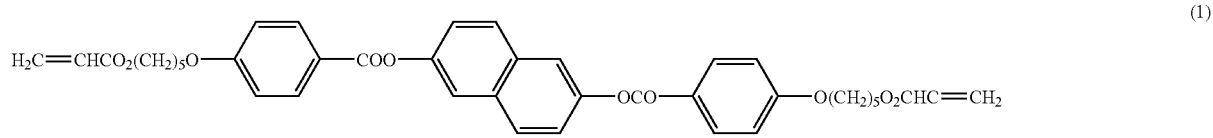

(1)

(2)

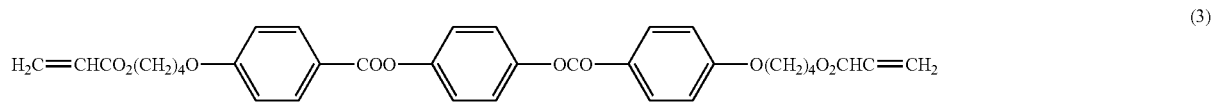

(3)

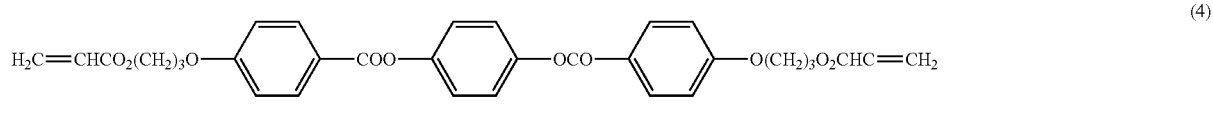

(4)

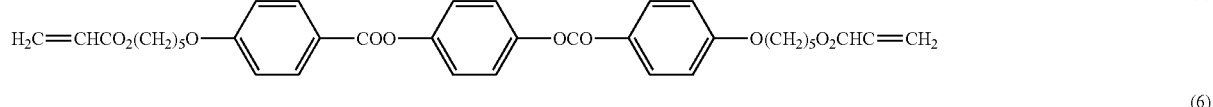

(5)

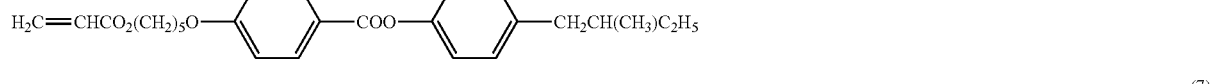

(6)

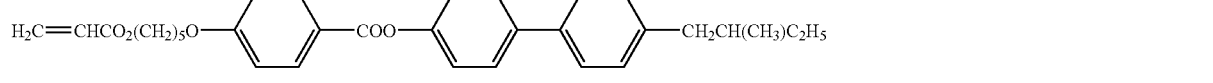

(7)

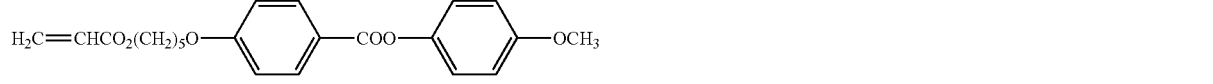

(8)

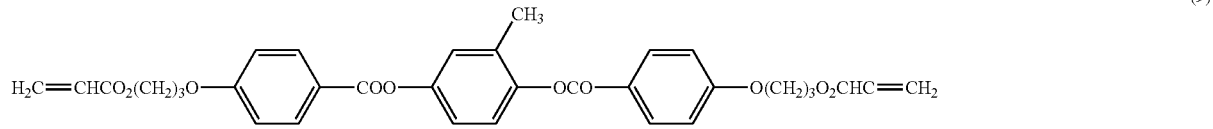

(9)

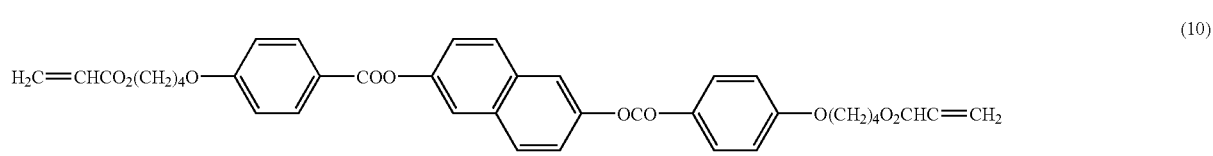

(10)

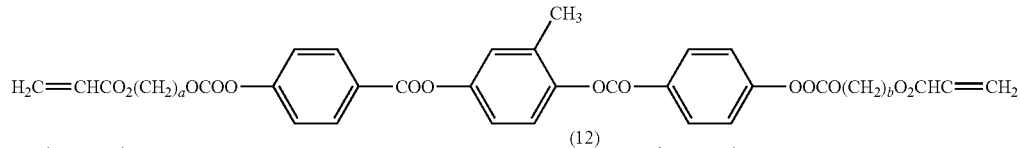

(11)

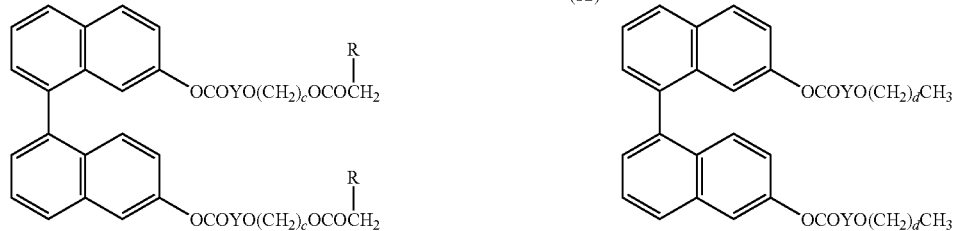

(12)

(13)

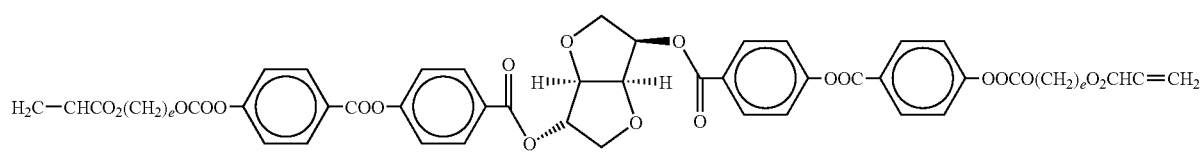

(14)

In formulae (11) to (14), a to e representing the number of methylene groups (chain length of alkylene group) each are an integer and are 2 to 5. a and b are each independently an integer of 2 to 12, more preferably 4 to 10, particularly preferably 6 to 9. c and d are each 2 to 12, more preferably 4 to 10, particularly preferably 6 to 9.

The retardation layer may be formed by providing the above ionizing radiation polymerizable liquid crystal composition, for example, the photopolymerizable liquid crystal composition, optionally dissolving the composition in a solvent or diluting the composition with a solvent, properly coating the composition by spin coating, die coating, slit coating, or other method, raising the temperature to a temperature at which a liquid crystal phase is developed to align the liquid crystal, and then applying an ionizing radiation (for example, ultraviolet light) for polymerization.

A silane coupling agent may be incorporated in the composition for retardation layer formation. The silane coupling agent preferably contains a hydrophilic functional group such as amine. Further, from the viewpoint of preparing a composition for retardation layer formation, the silane coupling agent is preferably soluble in an organic solvent. Specifically, the silane coupling agent may be one or at least two compounds selected from compounds which will be described later. The mixing amount is on such a level that will not sacrifice the alignment of the liquid crystal, that is, about 0.001% to 10% (on a mass basis), more preferably about 0.01 to 5%, based on the liquid crystal material.

Specific examples of silane coupling agents include N-2-(aminoethyl)-3-aminopropylmethyldimethoxysilane (Shin-Etsu Silicone "KBM-602" manufactured by The Shin-Etsu Chemical Co., Ltd.), N-2-(aminoethyl)-3-aminopropyltrimethoxysilane (Shin-Etsu Silicone "KBM-603" manufactured by The Shin-Etsu Chemical Co., Ltd.), 3-aminopropyltrimethoxysilane (Shin-Etsu Silicone "KBM-903" manufactured by The Shin-Etsu Chemical Co., Ltd.), γ-aminopropyltriethoxysilane ("TSL-8331", manufactured by GE Toshiba Silicone Co., Ltd.), N-(β-aminoethyl)-γ-aminopropyltrimethoxysilane ("TSL-8340" manufactured by GE Toshiba Silicone Co., Ltd.), N-(β-aminoethyl)-γ-aminopropylmethyldimethoxysilane ("TSL-8345" manufactured by GE Toshiba Silicone Co., Ltd.), γ-(2-aminoethyl)-aminopropyltrimethoxysilane ("SH-6020", manufactured by Dow Corning), and γ-(2-aminoethyl)-aminopropylmethyldimethoxysilane ("SH-6023", manufactured by Dow Corning).

Further, preferably, a photopolymerization initiator is added in the composition for retardation layer formation in such an amount that does not sacrifice the alignment of the liquid crystal. The addition of a radical polymerization initiator capable of generating free radicals upon exposure to ultraviolet light energy is preferred. The addition amount of the photopolymerization initiator is about 0.01% to 15% (on a mass basis), more preferably about 0.5% to 10%, based on the liquid crystal material.

Specific examples of photopolymerization initiators include benzyl (known also as "bibenzyol"), benzoin isobutyl ether, benzoin isopropyl ether, benzophenone, benzoylbenzoic acid, methyl benzoyl benzoate, 4-benzoyl-4'-methyldiphenyl sulfide, benzyl methyl ketal, dimethylaminomethyl benzoate, 2-n-butoxyethyl-4-dimethylamino benzoate, isoamyl p-dimethylamino benzoate, 3,3'-dimethyl-4-methoxybenzophenone, methylbenzoyl formate, 2-methyl-1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclohexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-chloro-4-propoxythioxanthone.

(5) Seal Material

The seal material may be any seal material so far as it is generally used in liquid crystal display panels. For example, a resin seal material comprising a resin material may be used as the seal material. The resin seal material may be one or at least two resins selected, for example, from bisphenol F diglycidyl ethers, bisphenol A diglycidyl ethers, resorcinol diglycidyl ether resins, phenol novolak epoxy resins, or triphenolmethane epoxy resins. Specific examples thereof include a seal material "XN-5A", manufactured by Mitsui Chemicals Inc. This seal material may optionally contain other components. Examples of other components include fine particles such as fine particles of carbon black, resin coated carbon black, iron Oxide, titanium oxide, aniline black, and cyanine black, inorganic fillers such as talc and mica, silane coupling agents such as aminosilane and epoxysilane, solvents such as cellosolves and carbitols, and curing accelerators such as imidazoles, triphenylphosphine bicycloundecene, and tris-dimethylaminomethylphenol.

A liquid crystal display panel comprising a color filter substrate and a counter substrate stacked onto each other through a seal material 30 can be prepared by preparing a composition, by incorporating necessary components in the above resin, applying the composition by means such as printing onto a substrate 11 onto a retardation layer 14, or a part which lies across the top of the substrate 11 and the top of the retardation layer 14, optionally drying the coating to such an extent that does not hinder handling, then putting the color filter substrate on top of the counter substrate, pressing the assembly, and curing the composition by curing means such as heating or ultraviolet irradiation. In this case, after the application of the composition for seal material 30 formation onto the counter substrate 20 side, the color filter substrate 10 may be stacked. Alternatively, a method may also be adopted in which the composition is applied onto both the color filter substrate 10 side and the counter substrate 20 side.

EXAMPLES

A melt molded borosilicate thin sheet glass having a thickness of 0.7 mm (manufactured by Corning Incorporated, stock number: 7059) was provided as a substrate and was cleaned. Thereafter, a photoresist for black matrix formation was spin coated onto the substrate. The coating was then prebaked under conditions of temperature 90° C. and heating time 3 min. After the prebaking, ultraviolet light was applied to the coated face at an exposure of 100 ml/cm$^2$ through a predetermined pattern. After the exposure, spray development was carried out with a 0.05% aqueous KOH solution for 60 sec, followed by post baking under conditions of temperature 200° C. and heating time 30 min. Thus, a 1.5 μm-thick black matrix having openings corresponding to pixels was formed.

In this case, in order to examine the influence of a level difference in the picture frame part, a substrate having a larger size than the conventional size was used. Specifically, a substrate having a size which is larger by 60 mm in both length and breadth than the display size, was used. The black matrix was formed so that the display size part is located at the center of the substrate. Further, a 20 mm-width full-density blotted layer part (a fill part with a given thickness) was provided on the outer side of the periphery of the display size part. A 10 mm-width margin was provided on the peripheral part of the glass substrate.

Next, a photoresist for red pattern formation was spin coated on the substrate with the black matrix formed thereon, followed by prebaking under conditions of temperature 180° C. and heating time 15 min. Thereafter, alignment exposure was carried out with an ultraviolet light source at an exposure of 300 ml/cm$^2$ though a predetermined pattern. After the exposure, spray development was carried out with a 0.1% aqueous KOH solution for 60 sec, and post baking was then carried out under conditions of temperature 200° C. and heating time 60 min. Thus, a 2.6 μm-thick red pattern was formed at positions corresponding to predetermined openings of the black matrix. Each of color patterns including the red pattern was formed in an area in the display size range.

Next, a 2.6 μm-thick green pattern was formed in the same manner as in the red pattern formation step, except that a photoresist for green pattern formation was used. Subsequently, a 2.6 μm-thick blue pattern was formed using a photoresist for blue pattern formation. The red, green and blue patterns were formed so as to be arranged in positions corresponding to different openings of the black matrix. Thus, a color filter layer was formed in which three-color patterns, i.e., a red pattern, a green pattern, and a blue pattern, were arranged.

In some cases, a transparent protective layer is provided on a color filter layer. In this Example, the provision of the transparent protective layer was omitted.

The photoresists used in the formation of the black matrix and the color filter layer, that is, a photoresist for black matrix formation, a photoresist for red pattern formation, a photoresist for green pattern formation, and a photoresist for blue pattern formation, were prepared by mixing a dispersion liquid composition and a clear resist composition together. The dispersion liquid composition was prepared by adding beads to a dispersion composition comprising a pigment, a dispersant, and a solvent, dispersing them in each other with a paint shaker as a dispergator for 3 hr, and removing the beads. The clear resist composition comprised a polymer, a monomer, an additive, an initiator, and a solvent. The photoresists had the following respective compositions (all "parts" are by mass).

Photoresist for Black Matrix Formation

| | |
|---|---|
| Black pigment | 14.0 parts |
| (TM Black #9550, manufactured by Dainichiseika Color & Chemicals Manufacturing Co., Ltd.) | |
| Dispersant | 1.2 parts |
| (Disperbyk 111, manufactured by BYK-Chemie K. K.) | |
| Polymer | 2.8 parts |
| ((Meth)acrylic resin, stock number; VR 60, manufactured by Showa High Polymer Co., Ltd.) | |
| Monomer | 3.5 parts |
| (Polyfunctional acrylate, stock number; SR 399, manufactured by Sartomer) | |
| Additive (dispersion improver) | 0.7 part |
| (CHEMTREE-L-20, manufactured by Soken Chemical Engineering Co., Ltd.) | |
| Initiator | 1.6 parts |
| (2-benzyl-2-dimethylamino-1-(4-morpholinophenyl)-butanone-1) | |
| Initiator (4,4'-diethylaminobenzophenone) | 0.3 part |
| Initiator (2,4-diethylthioxanthone) | 0.1 part |
| Solvent (ethylene glycol monobutyl ether) | 75.8 parts |

Photoresist for Red Pattern Formation

| | |
|---|---|
| Red pigment (C.I. PR 254) | 3.5 parts |
| (CROMOPHTAL DPP Red BP, manufactured by Ciba Specialty Chemicals, K.K.) | |
| Yellow pigment (C.I. PY 139) | 0.6 part |
| (Paliotol Yellow D1819, manufactured by BASF) | |
| Dispersant | 3.0 part |
| (Solsperse 24000, manufactured by Zeneca Co., Ltd.) | |
| Polymer 1 (See below) | 5.0 parts |
| Monomer | 4.0 parts |
| (Polyfunctional acrylate, stock number; SR 399, manufactured by Sartomer) | |
| Initiator | 1.4 parts |
| (Irgacure 907, manufactured by Ciba Specialty Chemicals, K.K.) | |
| Initiator | 0.6 part |

-continued

| | |
|---|---|
| (2,2'-bis(o-chlorophenyl)-4,5,4',5'-tetraphenyl-1,2'-biimidazole) | |
| Solvent<br>(propylene glycol monomethyl ether acetate) | 80.0 parts |

Polymer 1 is a polymer prepared by adding 16.9% by mole of 2-methacryloyloxyethyl isocyanate to 100% by mole of a copolymer of benzyl methacrylate: styrene: acrylic acid: 2-hydroxyethyl methacrylate=15.6: 37.0: 30.5: 16.9 (molar ratio) and has a weight average molecular weight of 42500. The same shall apply hereinafter.

Photoresist for Green Pattern Formation

A photoresist for green pattern formation was prepared in the same manner as in the photoresist for red pattern formation, except that the following pigments were used according to the following formulation instead of the red and yellow pigments in the photoresist for red pattern formation.

| | |
|---|---|
| Green pigment (C.I. PG 7)<br>(Seikafast Green 5316P, manufactured by Dainichiseika Color & Chemicals Manufacturing Co., Ltd.) | 3.7 parts |
| Yellow pigment (C.I. PY 139)<br>(Paliotol Yellow D1819, manufactured by BASF) | 2.3 parts |

Photoresist for Blue Pattern Formation

A photoresist for blue pattern formation was prepared in the same manner as in the photoresist for red pattern formation, except that the following pigments were used according to the following formulation instead of the red and yellow pigments and the dispersant in the photoresist for red pattern formation.

| | |
|---|---|
| Blue pigment (C.I. PB 15:6)<br>(Heliogen Blue L 6700F, manufactured by BASF) | 4.6 parts |
| Violet pigment (C.I. PV 23)<br>(Hostaperm RL-NF, manufactured by Clariant) | 1.4 parts |
| Pigment derivative<br>(Solsperse 12000, manufactured by Zeneca Co., Ltd.) | 0.6 part |
| Dispersant<br>(Solsperse 24000, manufactured by Zeneca Co., Ltd.) | 2.4 parts |

After a black matrix and a color filter layer were formed on a substrate, a photosensitive resin composition for C plate formation having the following formulation was spin coated onto the formed layers. After coating, the assembly including the substrate was placed on a hot plate and heated under conditions of temperature 80° C. and heating time 3 min to remove the solvent and to develop a liquid crystal structure in the coating film. Thereafter, the whole area of the coating film was exposed to ultraviolet light with a wavelength of 365 nm at an exposure of 50 J/cm². After the exposure, the assembly including the substrate was placed on a hot plate of a temperature of 230° C. for 30 min for heating to fully cure the coating film. Thus, a 4.0 µm-thick C plate retardation layer was formed to prepare a color filter substrate. The retardation layer was formed so as to extend to the end of the substrate.

Photosensitive Resin Composition for C Plate Formation

| | |
|---|---|
| Polymerizable liquid crystal monomer<br>(which exhibits nematic liquid crystal phase represented by formula (11)) | 22 parts |
| Polymerizable chiral agent<br>(represented by formula (14)) | 1.8 parts |
| Photopolymerization initiator<br>(Irgacure 907, manufactured by Ciba Specialty Chemicals, K.K.) | 1.3 parts |
| Amine silane coupling agent<br>(TSL-8331, manufactured by GE Toshiba Silicone Co., Ltd.) | 0.05 part |
| Solvent (chlorobenzene) | 75 parts |

Evaluation

For the color filter substrates thus obtained, a difference in level between a black matrix-free position and a black matrix-provided position was measured. The difference in level was determined by measuring the difference of elevation of the surface of the retardation layer with a tracer type surface roughness meter ("DEKTAK," manufactured by Veeco Instruments Inc., Sloan Technology Division). The difference in level before the provision of the retardation layer was also measured in the same manner as described just above.

Figure 8:
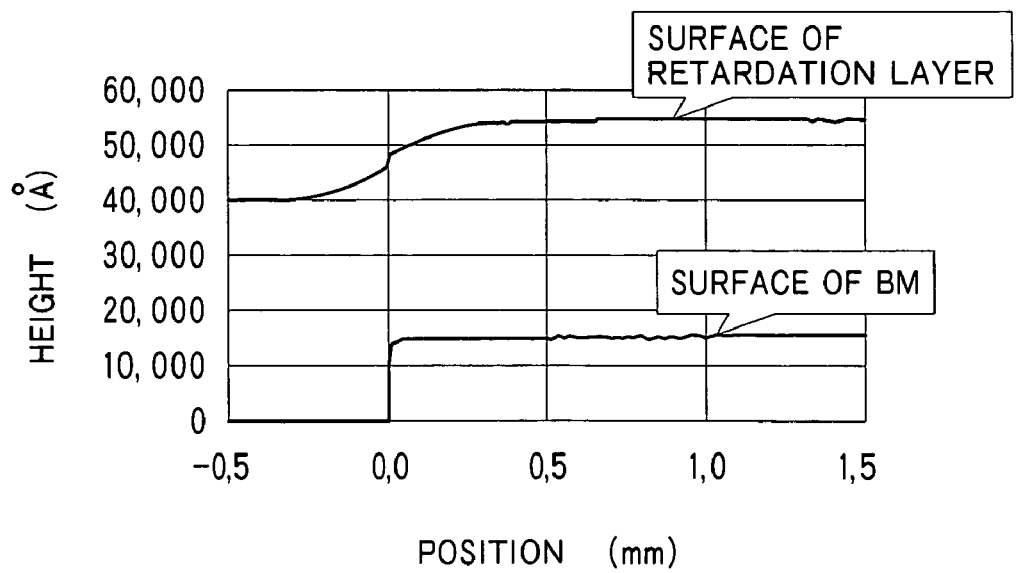
FIG. 8 is a graph showing a difference in level between a picture frame part and a retardation layer.

The results were as shown in FIG. 8. As is also apparent from the results shown in FIG. 8, the flatness of the surface of the retardation layer is maintained on the resin black matrix, whereas, in the retardation layer in its part located outside the top of the resin black matrix, a change level in a height-wise direction is increased. In FIG. 8, it is apparent that, in the color filter substrate before the provision of the retardation layer, a difference in level between the black matrix-provided part and the black matrix-free part is rapidly changed (a position of 0.0 mm in the drawing), whereas, when the retardation layer is provided, a gentle level difference is provided from around 0.5 mm inward from the periphery of the black matrix.

What is claimed is:

1. A color filter substrate comprising: a substrate having a first surface and an opposed second surface; and at least a black matrix layer, a color filter layer, and a retardation layer stacked on the first surface of the substrate, wherein the black matrix layer is formed of a resin composition containing a black colorant and comprises (i) a display part, which has been patterned to form an opening part for displaying an image and (ii) a frame part, which has not been patterned, provided on the periphery of the display part, wherein the color filter layer is stacked only in the display part of the black matrix layer, wherein the color substrate is used for a liquid crystal display panel comprising the color filter substrate and a counter substrate stacked on top of each other through a seal material and a liquid crystal hermetically sealed between the two substrates;

wherein the retardation layer is located between the first surface of the color filter substrate and the counter substrate in the liquid crystal display panel;

wherein an area of the black matrix layer that includes at least the frame part, but not the display part is an area to be sealed, wherein the area to be sealed includes an area where the retardation layer is stacked, and wherein a seal material is provided on at least a part of the retardation layer, but does not contact the black matrix layer or the color filter layer.

2. The color filter substrate according to claim 1, wherein the black matrix layer, the color filter layer, and the retardation layer are stacked in that order on the substrate.

3. The color filter substrate according to claim 1, wherein the black matrix layer, the retardation layer, and the color filter layer are stacked in that order on the substrate.

4. The color filter substrate according to claim 1, wherein the area to be sealed includes an area where the frame part is stacked.

5. The color filter substrate according to claim 1, wherein the area to be sealed is an area where the frame part is stacked.

6. The color filter substrate according to claim 1, wherein the area to be sealed is an area where the retardation layer is stacked.

7. A liquid crystal display panel comprising the color filter substrate according to claim 1.

* * * * *

UNITED STATES PATENT AND TRADEMARK OFFICE
CERTIFICATE OF CORRECTION

PATENT NO. : 7,643,110 B2
APPLICATION NO. : 11/373065
DATED : January 5, 2010
INVENTOR(S) : Kawashima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 508 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

PATENT NO.         : 7,643,110 B2
APPLICATION NO.    : 11/373065
DATED              : January 5, 2010
INVENTOR(S)        : Tomoya Kawashima and Norihisa Moriya It is certified that error appears in the above-identified patent and that said Letters Patent is hereby corrected as shown below:

Column 9
    *Line 3*: change "An" to --$\Delta$n--

Columns 11 and 12
    *Formula compound (14)*: change "$H_2C$–$CHCO_2$..." to --$H_2C=CHCO_2$...--

Signed and Sealed this
Fourth Day of January, 2011

David J. Kappos
*Director of the United States Patent and Trademark Office*

UNITED STATES PATENT AND TRADEMARK OFFICE
CERTIFICATE OF CORRECTION

PATENT NO.        : 7,643,110 B2
APPLICATION NO.   : 11/373065
DATED             : January 5, 2010
INVENTOR(S)       : Tomoya Kawashima and Norihisa Moriya Page 1 of 1

It is certified that error appears in the above-identified patent and that said Letters Patent is hereby corrected as shown below:

Column 13
  *Line 38*: change "100 ml/cm$^2$" to --100 mJ/cm$^2$--
  *Line 62*: change "300 ml/cm$^2$" to --300 mJ/cm$^2$--

Signed and Sealed this
Twelfth Day of April, 2011

David J. Kappos
*Director of the United States Patent and Trademark Office*